(12) United States Patent
Yuan et al.

(10) Patent No.: US 7,730,229 B2
(45) Date of Patent: Jun. 1, 2010

(54) DETERMINING AN AGGREAGATED ACTIVE/STANDBY STATE FOR AN INTERFACE UNIT FORM ENTITY ACTIVE/STANDBY STATES

(75) Inventors: Catherine Yuan, Plano, TX (US); Vikas Mittal, Wylie, TX (US); Raghu Rajan, Plano, TX (US); Yanbing Li, Plano, TX (US); Milind Kulkarni, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 11/566,720

(22) Filed: Dec. 5, 2006

(65) Prior Publication Data

US 2008/0126596 A1 May 29, 2008

Related U.S. Application Data

(60) Provisional application No. 60/820,663, filed on Jul. 28, 2006.

(51) Int. Cl.
*G06F 3/00* (2006.01)
(52) U.S. Cl. .......................................... 710/15; 710/19
(58) Field of Classification Search .................... 710/19
See application file for complete search history.

(56) References Cited

U.S. PATENT DOCUMENTS

| 6,487,169 | B1* | 11/2002 | Tada ........................... 370/219 |
| 6,616,344 | B1* | 9/2003 | Van Deventer ............... 385/88 |
| 2004/0073834 | A1* | 4/2004 | Kermaani et al. ............. 714/13 |
| 2005/0055472 | A1* | 3/2005 | Krzyzanowski et al. ........ 710/5 |
| 2005/0265330 | A1* | 12/2005 | Suzuki et al. ............... 370/389 |
| 2007/0237164 | A1* | 10/2007 | Gazzola et al. ............. 370/419 |

OTHER PUBLICATIONS

"Generic State Requirements for Network Elements (NEs)", Telcordia Technologies Generic Requirements, GR-1093-CORE, Issue 2, 92 total pages, Jun. 2000.
Flashwave® 7500, Metro/Regional ROADM Platform, 4.0/06.06/CM, Release 4.2, Fujitsu Network Communications Inc., www.us.fujitsu.com/telecom, 4 pages, 2006.

* cited by examiner

*Primary Examiner*—Alford W Kindred
*Assistant Examiner*—Brooke J Dews
(74) *Attorney, Agent, or Firm*—Baker Botts L.L.P.

(57) ABSTRACT

Determining an active/standby state for an interface unit includes determining an entity active/standby state for each entity of one or more entities of the interface unit. If each entity active/standby state is standby, then an aggregated active/standby state of the interface unit is established to be standby.

20 Claims, 2 Drawing Sheets

DETERMINING AN AGGREAGATED ACTIVE/STANDBY STATE FOR AN INTERFACE UNIT FORM ENTITY ACTIVE/STANDBY STATES

RELATED APPLICATION

This application claims benefit under 35 U.S.C. §119(e) of U.S. Provisional Application Ser. No. 60/820,663, entitled "Method and System for Aggregation of State Information to Reflect Network Node Equipment Status," filed Jul. 28, 2006, by Catherine Yuan, et al.

TECHNICAL FIELD

This invention relates generally to the field of communication networks and more specifically to determining an active/standby state for an interface unit.

BACKGROUND

A component of a network node may have an active/standby state that indicates whether the component is in an active or standby state. For example, a node may have a shelf with a number of pluggable interface units that perform various operations for the node. A pluggable interface unit may have a particular active/standby state that indicates whether the unit in an active or standby state. An active state may indicate that the interface unit is in use, and a standby state may indicate that the interface unit is not in use, but is ready to be put into use.

Although some standards, such as the Generic Criteria for Network Telecommunications Equipment GR-1093 standard, exist for providing such state information, not all network equipment implements such standards.

SUMMARY OF THE DISCLOSURE

In accordance with the present invention, disadvantages and problems associated with previous techniques for determining an active/standby state for an interface unit may be reduced or eliminated.

According to one embodiment of the present invention, determining an active/standby state for an interface unit includes determining an entity active/standby state for each entity of one or more entities of the interface unit. If each entity active/standby state is standby, then an aggregated active/standby state of the interface unit is established to be standby.

Certain embodiments of the invention may provide one or more technical advantages. A technical advantage of one embodiment may be that an interface unit may have an aggregated active/standby state that takes into account the active/standby states of the entities of the interface unit. The aggregated active/standby state may indicate whether the interface unit may be safely removed without impacting service.

A technical advantage of another embodiment may be that an alarm for a network problem at the interface unit may take into account the active/standby states of the entities of the interface unit. The alarm may indicate whether the problem affects service.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
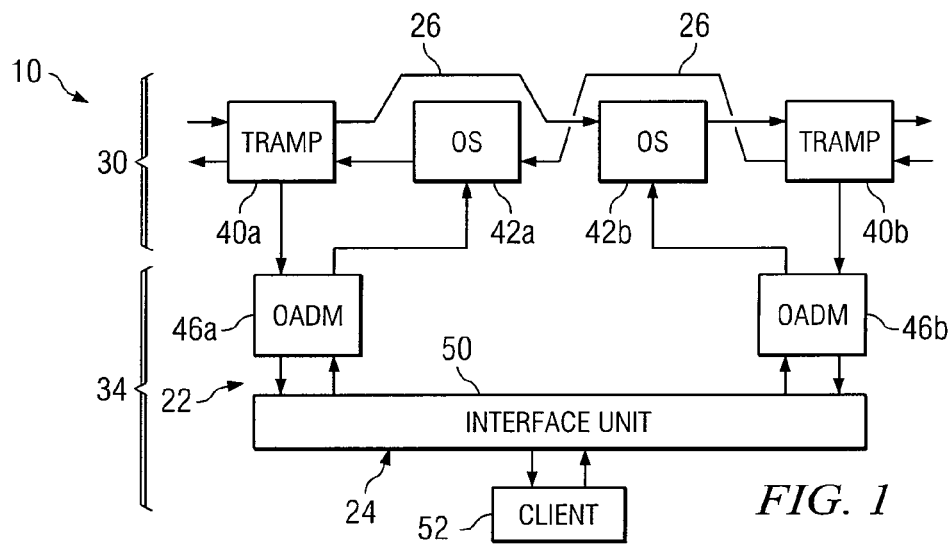
FIG. 1 illustrates one embodiment of a portion of a network system for which an active/standby state of an interface unit may be determined.
Figure 2:
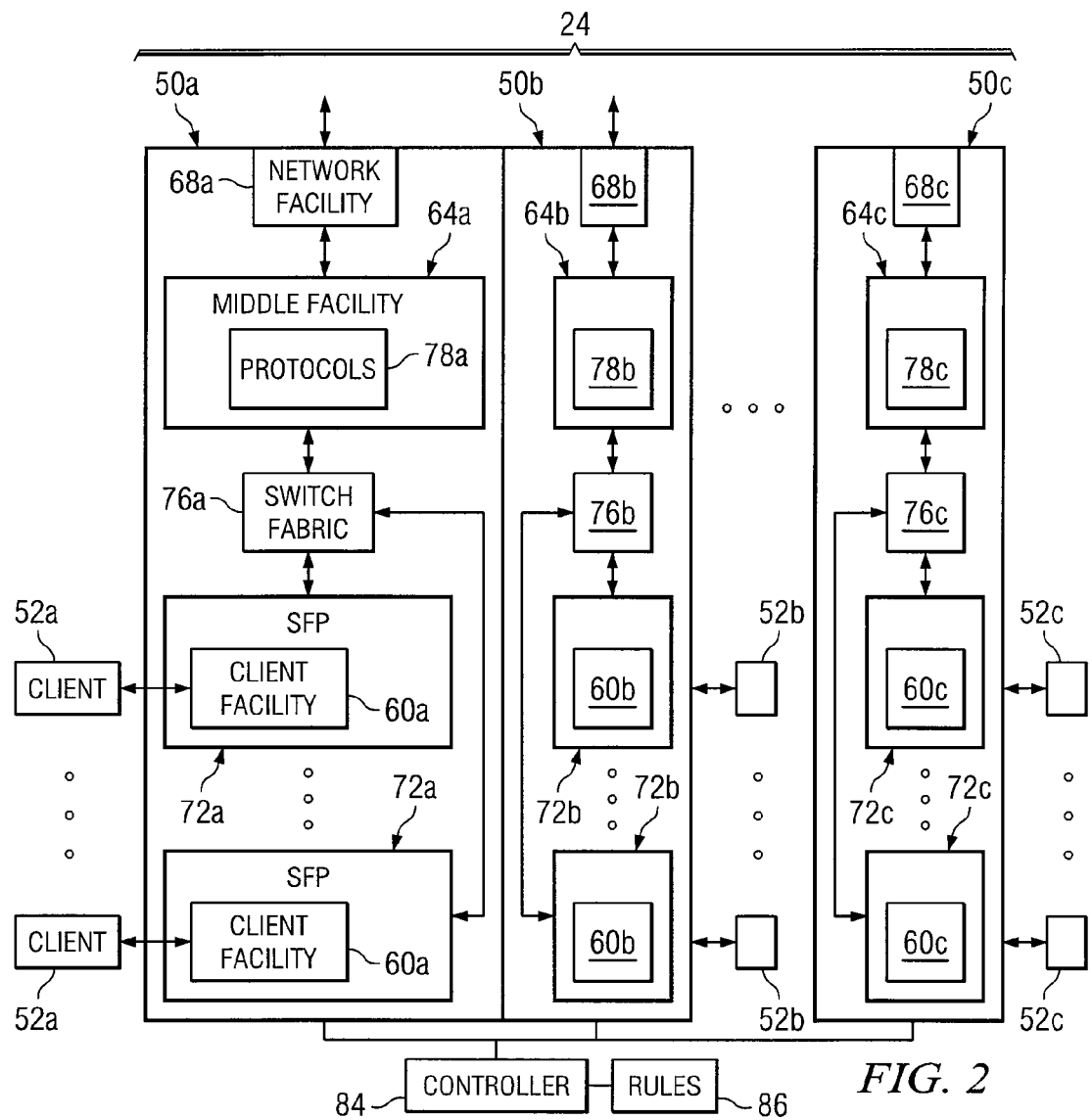
FIG. 2 illustrates one embodiment of a network element that may be used with the network system portion of FIG. 1.
Figure 3:
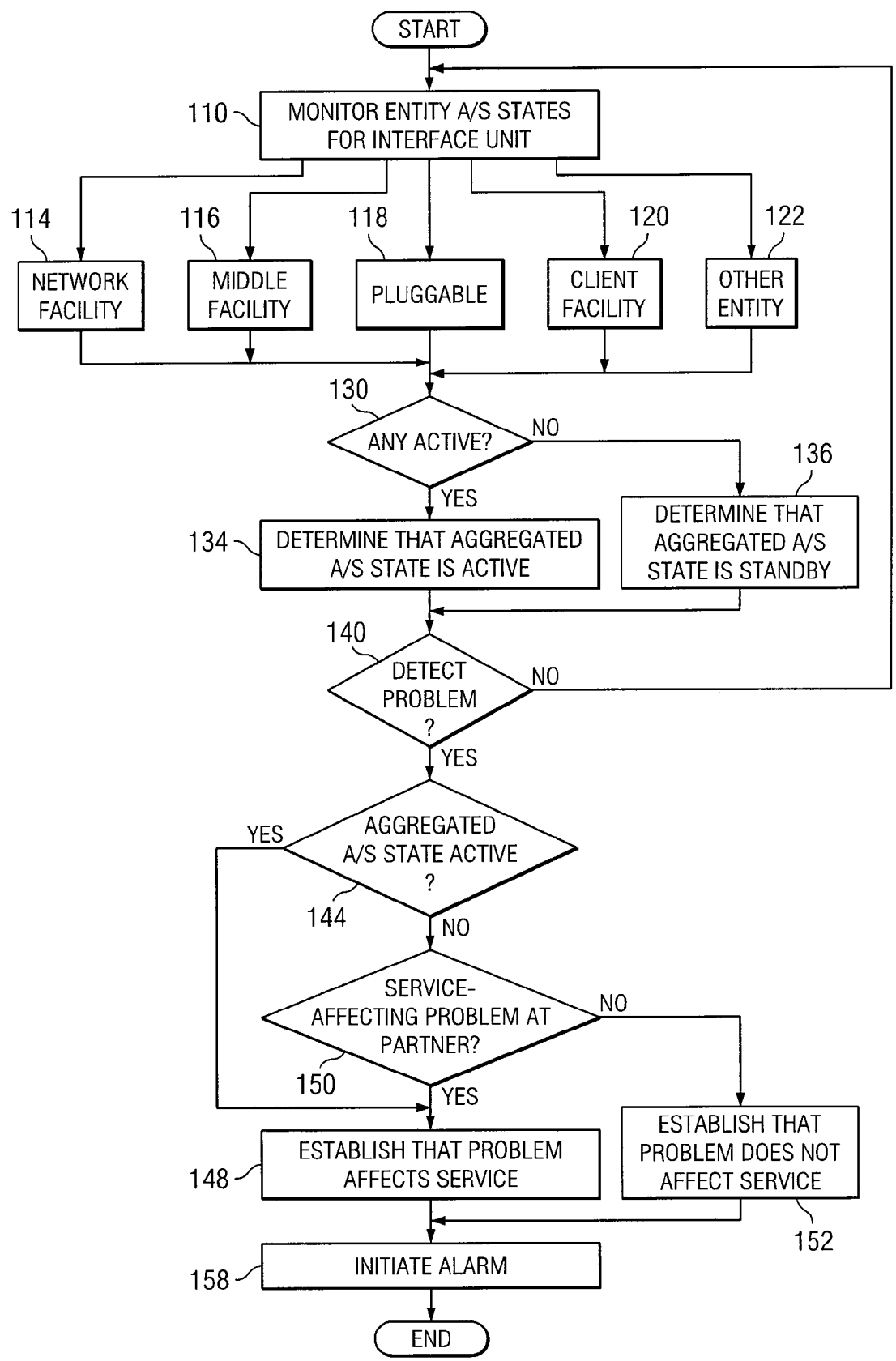
FIG. 3 illustrates one embodiment of a method for establishing an aggregated active/standby state of an interface unit that may be used with the network element of FIG. 2.

Embodiments of the present invention and its advantages are best understood by referring to FIGS. 1 through 3 of the drawings, like numerals being used for like and corresponding parts of the various drawings.

FIG. 1 illustrates one embodiment of a portion 10 of a network system. According to the embodiment, network system portion 10 includes a network element that has interface units. In the embodiment, an interface unit may have an aggregated active/standby state that takes into account the active/standby states of the entities of the interface unit. The aggregated active/standby state may indicate whether the interface unit may be safely removed without impacting service. In addition, in the embodiment, an alarm for a network problem at the interface unit may take into account the active/standby states of the entities of the interface unit. The alarm may indicate whether the problem affects service.

A network system includes devices. In general, a device may include any suitable components operable to perform the operations of the device. As an example, a device may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

According to one embodiment, logic (such as software and/or hardware) may have an active/standby state. The active/standby state may indicate whether the logic is in an active state or a standby state. The logic may be in an active state when the logic is in use. The logic may be in standby state when the logic is ready for use, but not in use.

"Interface" may receive input for the device, send output from the device, perform suitable processing of the input and/or output, or any combination of the preceding, and may comprise one or more ports and/or conversion software.

"Memory" may store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

A network system may communicate information through signals. A signal may refer to an optical signal transmitted as light pulses. As an example, an optical signal may have a frequency of approximately 1550 nanometers and a data rate of 10, 20, 40, or over 40 gigabits per second. A signal may comprise a synchronous transport signal (STS). Information may refer to voice, data, audio, video, multimedia, control, signaling, other information, or any combination of the preceding. A signal may communicate information in packets, such as time division multiplexed (TDM) packets.

According to the illustrated embodiment, portion 10 may be a part of a ring network. A ring network may include nodes 22 coupled by fibers 26 in a ring topology. Any suitable ring topology may be used, for example, a unidirectional path-switched ring (UPSR) topology or a bidirectional line switched ring (BLSR) topology. According to one embodiment, ring network 20 may comprise an optical ring network with optical fibers 26.

A ring network may utilize protocols such as Resilient Packet Ring (RPR) protocols. An RPR protocol may refer to a protocol for ring-based packet transport, where packets are added, passed through, or dropped at each node. According to one embodiment, ring network may utilize any suitable transmission technique, such as Ethernet, Synchronous Optical Network (SONET), or wavelength division multiplexing (WDM) (such as dense wavelength division multiplexing (DWDM)) techniques.

According to the illustrated embodiment, network system portion 10 includes a node 22 with a pass-through path 30 and an add/drop path 34 coupled as shown. Pass-through path 30 allows signals to pass through node 22, and add/drop path 34 allows signals to be added to and/or dropped from the network system. Pass-through path 30 may include any components suitable for passing signals through node 22. In the illustrated embodiment, pass-through path 30 includes transmit/receive amplifiers (TRAMPs) 40 and optical spectrum analyzers (OSs) 42 coupled by fibers 26 as shown. Add/drop path 34 includes any suitable components operable to add or drop a signal from the network system. In the illustrated embodiment, add/drop path 34 includes optical add/drop multiplexers (OADMs) 46 and a network element 24 coupled by fibers 26 as shown.

Network element 24 may represent any suitable device operable to route signals to or from the network system. Examples of network elements 24 include dense wavelength division multiplexers (DWDMs), access gateways, endpoints, softswitch servers, trunk gateways, access service providers, Internet service providers, or other device operable to route packets to or from ring network.

Network element 24 may include one or more interface units (IUs) 50. Interface unit 50 may represent logic (such as hardware and/or software) that performs operations to communicate signals between a client and a network. Examples of operations include signal routing, signal aggregation and/or separation, analog-to-digital and/or digital-to-analog conversion, encoding and/or decoding, and/or signal transformation to satisfy different protocols. Examples of interface units 50 include pluggable interface units such as optical line cards. Examples of line cards include transponders, muxponders, and flexponders.

According to one embodiment, an interface unit 50 may have an aggregated active/standby state that takes into account the active/standby states of the entities of interface unit 50. An entity of interface unit 50 may refer to logic (such as hardware and/or software) of interface unit 50 that performs certain operations of interface unit 50. An example of network element 24 with interface units 50 is described in more detail with reference to FIG. 2.

A client 52 may use node 22 to send signals to the ring network or receive signals from the ring network. Client 52 may represent any suitable computer or computer system operable to communicated with node 22.

Modifications, additions, or omissions may be made to network system portion 10 without departing from the scope of the invention. The components of network system portion 10 may be integrated or separated according to particular needs. Moreover, the operations of network system portion 10 may be performed by more, fewer, or other devices. Additionally, operations of network system portion 10 may be performed using any suitable logic. As used in this document, "each" refers to each member of a set or each member of a subset of a set.

FIG. 2 illustrates one embodiment of a network element 24 that may be used with network system portion 10 of FIG. 1. Network element 24 communicates signals between clients 52 and the network system. According to the illustrated embodiment, network element 24 may have one or more interface units 50 and a controller 84 coupled as shown.

Interface units 50 perform certain operations of network element 24 to communicate signals. Network element 24 may include shelf slots that may be used to couple interface units 50 to network element 24. According to the illustrated embodiment, an interface unit 50 includes entities. An entity of interface unit 50 may refer to logic of interface unit 50 that performs certain operations of interface unit 50. Examples of entities includes facilities and pluggables.

A facility may refer to logic (such as software) that supports traffic for a specific service. A facility may allow for communication according to specific parameters, for example, format, protocol, rate of traffic, and/or other parameters. Network element 24 may include one or more client facilities 60, a middle facility 64, and a network facility 68. A client facility 60 supports communication with a particular client 52. Middle facility 64 processes signals for interface unit 50. According to one embodiment, middle facility 64 may include a protocol module 78. Protocol module 78 may be used to apply communication protocols to the signals. Network facility 68 supports communication with the network system.

A pluggable may refer to logic (such as hardware that may include software) that may be coupled to network element 24 to communicate signals. According to the illustrated embodiment, network element 24 may include any suitable number of small factor pluggables (SFPs) 72, for example, 4, 6, 8, 10, or more than 10. A small factor pluggable 72 may include a client facility 60. Switch fabric 76 may be used to aggregate signals from small factor pluggables 72 or to separate signals destined for small factor pluggables 72.

Traffic between clients 52 and the network system flows through and is processed by the entities of one or more interface units 50 of network element 24. In one example of operation, traffic going from a client 52 to the network system flows through small factor pluggable 72 that has the client facility 60 associated with the client 52. The traffic then flows from a switch fabric 76 through a middle facility 64 and a network facility 68. Traffic going from the network system to client 52 follows the reverse path. Traffic may flow through and be processed by the entities of one interface unit 50 or by multiple interface units 50, depending on the situation.

An entity may have an entity active/standby (A/S) state that indicates whether the entity is in active or standby state. For example, client facility 60 may have a client facility A/S state, middle facility 64 may have a middle facility A/S state, network facility 68 may have a network facility A/S state, and small factor pluggable 72 may have a small factor pluggable A/S state.

An interface unit 50 or an entity may have an active/standby relationship with a partner interface unit 50 or entity, respectively. In an active/standby relationship between partners, a first partner is in an active state, while a second partner is in a standby state, but stands ready to move to an active state. The first partner may experience a situation in which it can no longer operate properly. If this occurs, the second partner may move to an active state to perform the operations that the first partner can no longer perform.

An active/standby relationship may be used to protect traffic from clients 52. In one example, traffic from client 52*a* may be protected, where interface unit 50*a* is active and interface unit 50*b* is on standby. Traffic may travel along a path 80 from client 52*a* through client facility 60, small factor pluggable 72*a*, switch fabric 76*a*, middle facility 64*a*, and network facility 68*a*. If any of the entities along path 80 fail, the corresponding entity of interface unit 50*b* may take over. For example, if small factor pluggable 72*a* fails, small factor pluggable 72*b* may be used.

Controller 84 performs operations (such as configuration, provisioning, and/or monitoring operations) to manage network element 24, and may comprise a network element management card. According to one embodiment, may determine and maintain the states of network element 24. In the embodiment, controller 84 may establish an aggregated active/standby state for each interface unit 50. In addition, controller 84 may use entity active/standby states to establish whether a problem at interface unit 50 affects service.

Controller 84 may determine the aggregated active/standby state for an interface unit 50 in any suitable manner. An example of a method for determining the aggregated active/standby state is described with reference to FIG. 3. According to one embodiment, an aggregated active/standby state may be standby only if all of the entities of interface unit 50 used to determine the aggregated active/standby state have standby states. If any entity has an active state, then the aggregated active/standby state is active.

Entity active/standby states may be determined in any suitable manner. According to one embodiment, controller 84 may use rules 86 to determine entity active/standby states. Any suitable rules 86 may be used. In certain cases, a rule 86 may determine the active/standby state of an entity of an interface unit 50 from the actions of a client 52. For example, if a network node has selected a client facility 72, then the client facility 72 is active.

In other cases, a rule 86 may determine the active/standby state of one entity of an interface unit 50 from the active/standby state of another entity of the interface unit 50. As an example, if a network facility 68 of an interface unit 50 is active, then the middle facility 64 of the interface unit 50 is also active, or vice versa. As another example, if the client facility 60 of a small factor pluggable 72 is active, then the small factor pluggable 72 is also active.

In yet other cases, a rule 86 may determine the active/standby state of an entity from a partner entity. As an example, if a small factor pluggable is active, then the partner small factor pluggable 72 is in standby.

Controller 84 may establish whether a condition, such as a problem, at interface unit 50 affects service. A problem may refer to a situation that affects or even disrupts traffic flow. According to one embodiment, controller 84 may use rules 86 to determine whether a condition affects service. Any suitable rules 86 may be used. As an example, if the aggregate active/standby state is standby for an interface unit 50, then a condition that affects interface unit 50 does not affect service.

As another example, if an entity is active or if the partner entity has a service-affecting condition, the condition is service-affecting. Otherwise, the condition is not service-affecting. For example, if a client facility 60*a* is active or the partner client facility 60*b* has a service-affecting condition, then a condition at client facility 60*a* is service-affecting. As another example, if a pluggable 72*a* is active or the partner pluggable 72*b* has a service-affecting condition, then a condition at pluggable 72*a* is service-affecting. As another example, if the interface unit 50*a* is active or the partner interface unit 50*b* has a service-affecting condition, then a condition at interface unit 50*a* is service-affecting.

Controller 84 may perform other suitable operations to configure, provision, and/or monitor network element 24. As an example, controller 84 may receive instructions from a user through a user interface, and may implement the instructions to configure, provision, and/or monitor network element 24. As another example, controller 84 may provide configuration, provisioning, and/or monitoring information about network element 24 to other components of a network system.

Modifications, additions, or omissions may be made to network element 24 without departing from the scope of the invention. The components of network element 24 may be integrated or separated according to particular needs. Moreover, the operations of network element 24 may be performed by more, fewer, or other devices. Additionally, operations of network element 24 may be performed using any suitable logic.

FIG. 3 illustrates one embodiment of a method for establishing an aggregated active/standby state of an interface unit 50 that may be used with network element 24 of FIG. 2. According to one embodiment, controller 84 may perform the method.

The method starts at step 110, where entity A/S states for interface unit 50 are monitored. Entity A/S states indicate whether the entities of interface unit 50 are in an active or standby state. Steps 114 through 122 describe monitoring the entity A/S states for examples of entities. States of more, fewer, or other entities may be monitored.

A network facility A/S state for network facility 68 may be monitored at step 114. In one example, if middle facility 64 is active, then network facility 68 is also active. A middle facility A/S state for middle facility 64 may be monitored at step 116. In one example, if network facility 68 is active, then middle facility 64 is also active. Pluggable A/S states for pluggables 72 may be monitored at step 118. In one example, if the client facility 60 of a pluggable 72 is active, then the pluggable 72 is also active. Client facility A/S states for client facilities 60 may be monitored at step 120. In one example, if a client 52 has selected a client facility 72, then the client facility 72 is active. Any other entity A/S state may be monitored at step 122.

If any of the entity A/S states are active at step 130, the aggregated A/S state is determined to be active at step 134. If no entity A/S states are active at step 130, the aggregated A/S state is determined to be standby at step 136.

A problem of network element 24 may be detected at step 140. A problem may affect or even disrupt traffic flow through network element 24. If no problem is detected, the method returns to step 110 to continue to monitor the entity A/S states. If a problem is detected, the method proceeds to step 144.

If the aggregated A/S state is active at step 144, the problem is determined to affect service at step 148. If the aggregated A/S state is not active at step 144, the method proceeds to step 150. There may be a service-affecting problem at a partner entity or network element 24 at step 150. If there is a service-affecting problem, the problem is determined to affect service at step 148. If there is no service-affecting problem, the problem is determined to not affect service at step 152. An alarm is initiated at step 158. The alarm may indicate whether the problem affects service. After initiating the alarm, the method ends.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an interface unit may have an aggregated active/standby state that takes into account the active/standby states of the entities of the interface unit. The aggregated active/standby state may indicate whether the interface unit may be safely removed without impacting service.

A technical advantage of another embodiment may be that an alarm for a network problem at the interface unit may take into account the active/standby states of the entities of the interface unit. The alarm may indicate whether the problem affects service.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for determining an active/standby state for an interface unit, the method executed by one or more processors and comprising:
    determining an entity active/standby state for each entity of a plurality of entities of an interface unit of a network system to yield a plurality of entity active/standby states, the entities of the interface unit distinct from a plurality of fibers communicating a plurality of signals of the network system, the plurality of entities comprising a plurality of pluggables;
    if each entity active/standby state of the entity active/standby states is standby, then determining that an aggregated active/standby state that takes into account the entity active/standby states of the entities of the interface unit is standby indicating that removal of the interface unit will not affect service;
    if any entity active/standby state of the entity active/standby states is active, determining that the aggregated active/standby state of the interface unit is active; and
    providing monitoring information comprising the aggregated active/standby state to a component of the network system.

2. The method of claim 1, wherein determining the entity active/standby state for the each entity further comprises:
    if:
        the entities comprise a client facility and the pluggables comprise a pluggable associated with the client facility; and
        a client facility active/standby state of the client facility is active;
    then:
        establishing that a pluggable active/standby state of the pluggable is active.

3. The method of claim 1, wherein determining the entity active/standby state for the each entity further comprises:
    if:
        the entities comprise a client facility that has been selected;
    then:
        establishing that a client facility active/standby state of the client facility is active.

4. The method of claim 1, wherein determining the entity active/standby state for the each entity further comprises:
    if:
        the entities comprise a network facility and a middle facility; and
        a network facility active/standby state of the network facility is active;
    then:
        establishing that a middle facility active/standby state of the middle facility is active.

5. The method of claim 1, wherein determining the entity active/standby state for the each entity further comprises:
    if:
        an entity of the entities has a partner entity at another interface unit, the entity and the partner entity having an active/standby relationship; and
        a partner active/standby state of the partner entity is active;
    then:
        establishing that the entity active/standby state of the entity is standby.

6. The method of claim 1, further comprising establishing whether a service-affecting condition exists at the interface unit by:
    if either of the following occurs:
        an entity active/standby state is active; or
        another service-affecting condition exists at a partner entity of another interface unit;
    then:
        establishing that the service-affecting condition exists at the interface unit.

7. A controller that operates to determine an active/standby state for an interface unit, comprising:
    a memory that operates to store a plurality of entity active/standby states; and
    a processor coupled to the memory and that operates to:
        determine an entity active/standby state for each entity of a plurality of entities of an interface unit of a network system to yield the entity active/standby states, the entities of the interface unit distinct from a plurality of fibers communicating a plurality of signals of the network system, the plurality of entities comprising a plurality of pluggables;
        if each entity active/standby state of the entity active/standby states is standby, then determine that an aggregated active/standby state that takes into account the entity active/standby states of the entities of the interface unit is standby indicating that removal of the interface unit will not affect service;
        if any entity active/standby state of the entity active/standby states is active, determine that the aggregated active/standby state of the interface unit is active; and
        provide monitoring information comprising the aggregated active/standby state to a component of the network system.

8. The controller of claim 7, the processor operating to determine the entity active/standby state for the each entity by:
    if:
        the entities comprise a client facility and the pluggables comprise a pluggable associated with the client facility; and
        a client facility active/standby state of the client facility is active;
    then:
        establishing that a pluggable active/standby state of the pluggable is active.

9. The controller of claim 7, the processor operating to determine the entity active/standby state for the each entity by:
if:
the entities comprise a client facility that has been selected;
then:
establishing that a client facility active/standby state of the client facility is active.

10. The controller of claim 7, the processor operating to determine the entity active/standby state for the each entity by:
if:
the entities comprise a network facility and a middle facility; and
a network facility active/standby state of the network facility is active;
then:
establishing that a middle facility active/standby state of the middle facility is active.

11. The controller of claim 7, the processor operating to determine the entity active/standby state for the each entity by:
if:
an entity of the entities has a partner entity at another interface unit, the entity and the partner entity having an active/standby relationship; and
a partner active/standby state of the partner entity is active;
then:
establishing that the entity active/standby state of the entity is standby.

12. The controller of claim 7, the processor further operating establish whether a service-affecting condition exists at the interface unit by:
if either of the following occurs:
an entity active/standby state is active; or
another service-affecting condition exists at a partner entity of another interface unit;
then:
establishing that the service-affecting condition exists at the interface unit.

13. A memory storing logic for determining an active/standby state for an interface unit, one or more processors executing the logic operating to:
determine an entity active/standby state for each entity of a plurality of entities of an interface unit of a network system to yield a plurality of entity active/standby states, the entities of the interface unit distinct from a plurality of fibers communicating a plurality of signals of the network system, the plurality of entities comprising a plurality of pluggables;
if each entity active/standby state of the entity active/standby states is standby, then determine that an aggregated active/standby state that takes into account the entity active/standby states of the entities of the interface unit is standby indicating that removal of the interface unit will not affect service;
if any entity active/standby state of the entity active/standby states is active, determine that the aggregated active/standby state of the interface unit is active; and
provide monitoring information comprising the aggregated active/standby state to a component of the network system.

14. The memory of claim 13, the logic operating to determine the entity active/standby state for the each entity by:
if: the entities comprise a client facility and the pluggables comprise a pluggable associated with the client facility;
and a client facility active/standby state of the client facility is active;
then: establishing that a pluggable active/standby state of the pluggable is active.

15. The memory of claim 13, the logic operating to determine the entity active/standby state for the each entity by:
if: the entities comprise a client facility that has been selected;
then: establishing that a client facility active/standby state of the client facility is active.

16. The memory of claim 13, the logic operating to determine the entity active/standby state for the each entity by:
if: the entities comprise a network facility and a middle facility;
and a network facility active/standby state of the network facility is active;
then: establishing that a middle facility active/standby state of the middle facility is active.

17. The memory of claim 13, the logic operating to determine the entity active/standby state for the each entity by:
if: an entity of the entities has a partner entity at another interface unit, the entity and the partner entity having an active/standby relationship;
and a partner active/standby state of the partner entity is active;
then: establishing that the entity active/standby state of the entity is standby.

18. The memory of claim 13, the logic further operating establish whether a service-affecting condition exists at the interface unit by:
if either of the following occurs:
an entity active/standby state is active;
or another service-affecting condition exists at a partner entity of another interface unit;
then: establishing that the service-affecting condition exists at the interface unit.

19. A system for determining an active/standby state for an interface unit, comprising:
means for performing the following determining an entity active/standby state for each entity of a plurality of entities of an interface unit of a network system to yield a plurality of entity active/standby states, the entities of the interface unit distinct from a plurality of fibers communicating a plurality of signals of the network system, the plurality of entities comprising a plurality of pluggables;
means for determining that an aggregated active/standby state that takes into account the entity active/standby states of the entities of the interface unit is standby indicating that removal of the interface unit will not affect service, if each entity active/standby state of the entity active/standby states is standby;
means for determining that the aggregated active/standby state of the interface unit is active, if any entity active/standby state of the entity active/standby states is active; and
means for providing monitoring information comprising the aggregated active/standby state to a component of the network system.

20. A controller operating to determine an active/standby state for an interface unit, comprising:

a memory that operates to store a plurality of entity active/standby states; and a processor coupled to the memory and that operates to:

perform the following for each entity of a plurality of entities of an interface unit of a network system to yield the entity active/standby states, the entities of the interface unit distinct from a plurality of fibers communicating a plurality of signals of the network system, the plurality of entities comprising a plurality of pluggables;

determine an entity active/standby state for the each entity by:

if:
the entities comprise a client facility and a pluggable associated with the client facility; and
a client facility active/standby state of the client facility is active;
then:
establishing that a pluggable active/standby state of the pluggable is active;

if:
the entities comprise a client facility that has been selected;
then:
establishing that a client facility active/standby state of the client facility is active;

if:
the entities comprise a network facility and a middle facility; and
a network facility active/standby state of the network facility is active;
then:
establishing that a middle facility active/standby state of the middle facility is active;

if:
an entity of the entities has a partner entity at another interface unit, the entity and the partner entity having an active/standby relationship; and
a partner active/standby state of the partner entity is active;
then:
establishing that the entity active/standby state of the entity is standby; and if each entity active/standby state of the entity active/standby states is standby, then:
determine that an aggregated active/standby state that takes into account the entity active/standby states of the entities of the interface unit is standby, the aggregated active/standby state indicating that removal of the interface unit will not affect service; and establish whether a service-affecting condition exists at the interface unit by:
if either of the following occurs:
an entity active/standby state is active; or
another service-affecting condition exists at a partner entity of another interface unit;
then:
establishing that the service-affecting condition exists at the interface unit;

if any entity active/standby state of the entity active/standby states is active, determine that the aggregated active/standby state of the interface unit is active; and provide monitoring information comprising the aggregated active/standby state to a component of the network system.

* * * * *